(12) United States Patent
Peacock

(10) Patent No.: US 7,898,155 B2
(45) Date of Patent: *Mar. 1, 2011

(54) SYSTEM FOR GENERATING ELECTRICITY USING A CHEMICAL HEAT ENGINE AND PIEZOELECTRIC MATERIAL

(76) Inventor: Kimberly Peacock, Fresh Meadows, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/252,520

(22) Filed: Oct. 16, 2008

(65) Prior Publication Data
US 2009/0096322 A1  Apr. 16, 2009

Related U.S. Application Data

(63) Continuation of application No. 11/530,147, filed on Sep. 8, 2006, now Pat. No. 7,439,630.

(51) Int. Cl.
H01L 41/107 (2006.01)
H02N 2/18 (2006.01)

(52) U.S. Cl. .................... 310/339; 290/1 R
(58) Field of Classification Search ............. 310/339
See application file for complete search history.

(56) References Cited

U.S. PATENT DOCUMENTS

| | | | |
|---|---|---|---|
| 633,829 A | 9/1899 | Gallegos | |
| 1,974,483 A | 9/1934 | Brown | |
| 3,844,262 A * | 10/1974 | Dieges | 123/567 |
| 3,958,422 A * | 5/1976 | Kelly | 60/525 |
| 4,040,410 A * | 8/1977 | Libowitz | 126/619 |
| 4,044,821 A * | 8/1977 | Fletcher et al. | 165/104.12 |
| 4,306,416 A * | 12/1981 | Iozzi | 60/641.11 |
| RE30,840 E | 1/1982 | Terry | |
| 4,460,834 A | 7/1984 | Gottfried | |
| 4,754,805 A | 7/1988 | Rothmeyer | |
| 4,781,029 A * | 11/1988 | SerVaas | 60/641.7 |
| 4,928,496 A | 5/1990 | Wallace et al. | |
| 4,943,750 A | 7/1990 | Howe et al. | |
| 5,046,319 A | 9/1991 | Jones | |
| 5,165,243 A | 11/1992 | Bennett | |
| 5,497,630 A | 3/1996 | Stein et al. | |
| 5,705,902 A | 1/1998 | Merritt et al. | |
| 5,771,693 A | 6/1998 | Coney | |
| 6,353,276 B1 | 3/2002 | Gendron | |

(Continued)

OTHER PUBLICATIONS

"Integrated Cabin and Fuel Cell System Thermal Management with a Metal Hydride Heat Pump", V. Hovland, Conference Paper, National Renewable Energy Laboratory, Report No. NREL/CP-540-36735, Dec. 2004.

(Continued)

Primary Examiner — J. SanMartin
(74) Attorney, Agent, or Firm — Gordon & Jacobson, PC

(57) ABSTRACT

A system for generating electrical power supply signals includes at least one heat engine having a chamber that undergoes heating/cooling cycle and corresponding pressure variations. At least one piezoelectric transducer is deformed in response to the pressure variations of the heat engine. A power converter transforms the electric signals generated in response to deformation of the piezoelectric transducer(s) to a desired electrical power supply signal. The heat engine preferably uses a geothermal source of cold and an ambient source of hot or vice-versa. Hydrogen can be used as a working fluid, and metal hydride material can be used for absorbing and desorbing hydrogen during the cycle of heating and cooling of the heat engine. A phase change material can also be used. The power converter preferably includes an electromechanical battery with a flywheel storing rotational energy and possibly an electrostatic motor that adds rotational energy to the flywheel.

17 Claims, 13 Drawing Sheets

U.S. PATENT DOCUMENTS

| | | | |
|---|---|---|---|
| 6,396,186 | B1 | 5/2002 | Post |
| 6,425,440 | B1 | 7/2002 | Tsenter et al. |
| 6,591,616 | B2 * | 7/2003 | Ovshinsky et al. ............ 62/46.2 |
| 6,628,040 | B2 * | 9/2003 | Pelrine et al. ................. 310/307 |
| 6,722,154 | B1 * | 4/2004 | Tan et al. ........................ 62/480 |
| 6,899,967 | B2 | 5/2005 | Johnson |
| 6,969,944 | B2 * | 11/2005 | Staines et al. ................. 310/339 |
| 6,978,611 | B1 | 12/2005 | Landis |
| 7,128,270 | B2 | 10/2006 | Silverbrook et al. |
| 2002/0017380 | A1 | 2/2002 | Jonsson et al. |
| 2003/0234010 | A1 * | 12/2003 | Redmond ..................... 123/575 |
| 2004/0181154 | A1 | 9/2004 | Peterson et al. |
| 2004/0212280 | A1 * | 10/2004 | Radziemski et al. ......... 310/339 |
| 2005/0082949 | A1 | 4/2005 | Tsujiura |
| 2006/0119224 | A1 | 6/2006 | Keolian et al. |
| 2007/0258262 | A1 * | 11/2007 | Hanyon ........................ 362/600 |

OTHER PUBLICATIONS

"Power Generation from Piezoelectric Lead Zirconate Titanate Fiber Composites", F. Mohammadi et al., Mat. Res. Soc. Symp. Proc. vol. 736 © 2003 Materials Research Society.

"The Electromechanical Battery: The New Kid on the Block" Richard F. Post, Aug. 1993.

"A Micro Corona Motor", Sanghoon Lee et al., Science Direct, available at www.sciencedirect.com, Sep. 29, 2003.

"Marx Generators" Jim Lux, High Voltage Experimenter's Handbook, May 3, 1998.

A New Look at an Old Idea—The Electromechanical Battery, Science and Technology Review, Apr. 1996.

"Residential Piezoelectric Energy Sources", Andrew Katz, Delta Smart House, Jul. 21, 2004.

Generation and Storage of Electricity from Power Harvesting Devices, Henry A. Sodano et al., Journal of Intelligent Material Systems and Structures, vol. 16, No. 1, 67-75 (2005) DOI: 10.1177/1045389X05047210;2005 Sage Publications.

"Thermoacoustic Engines and Refrigerators" Resource Letter: TA-1, Steven L. Garrett, Am. J. Phys vol. 72 No. 1, Jan. 2004.

Metal Hydride Temperature Ampifiers for High Temperature (>260°) Applications—A Parametric Study, M.R. Ally, Oak Ridge National Laboratory, Dec. 1986.

"Parasitic Power Harvesting in Shoes", John Kymissis, et al., Draft 2.0, Aug. 1998; Presented at the Second IEEE International Conference on Wearable Computing.

"Electromagnetic Generators for Portable Power Appliations" Matthew Kurt Senesky, Dissertation, University of California, Berekley, Jun. 2005.

* cited by examiner

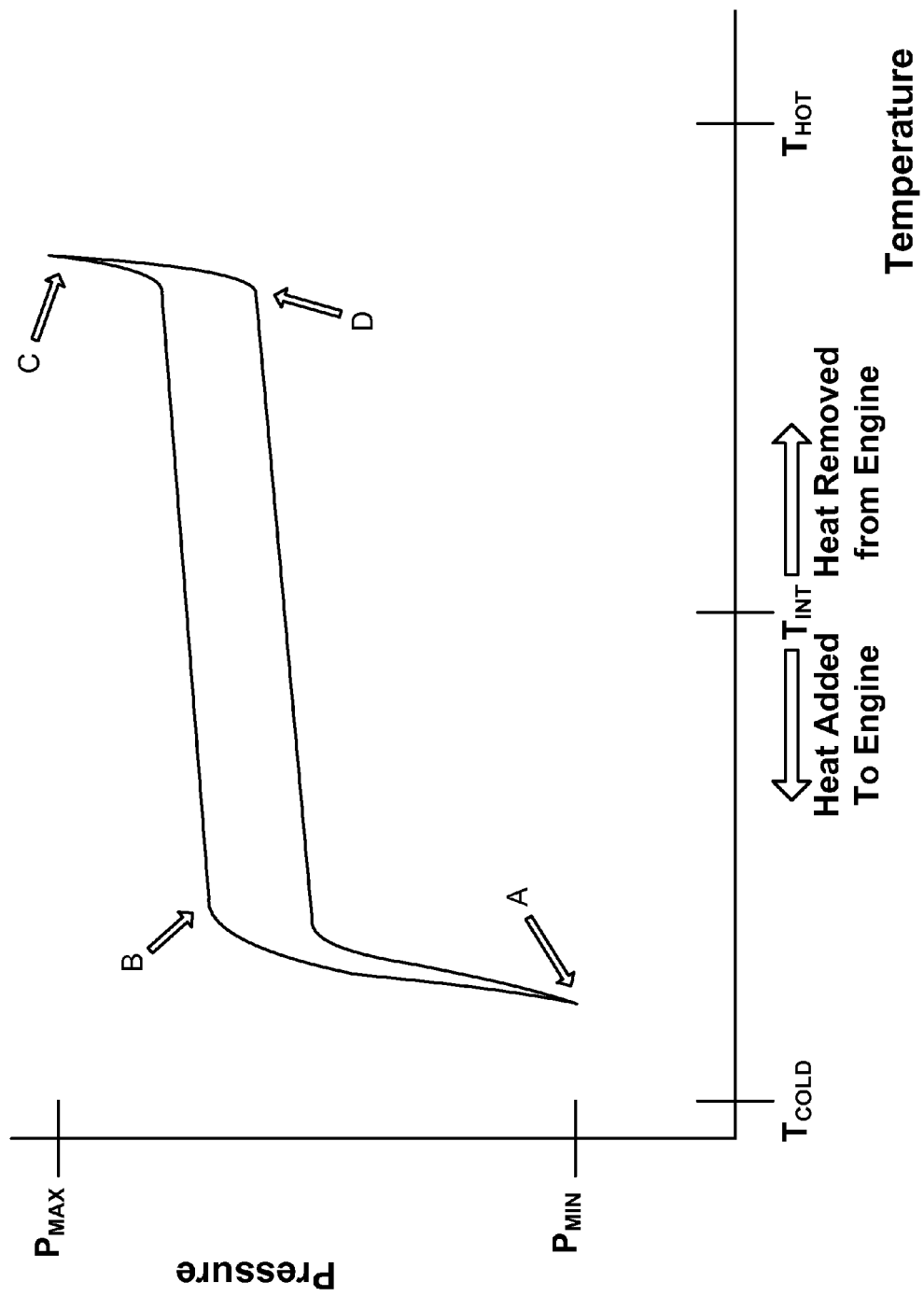

SYSTEM FOR GENERATING ELECTRICITY USING A CHEMICAL HEAT ENGINE AND PIEZOELECTRIC MATERIAL

CROSS-REFERENCE TO RELATED APPLICATION

This application is a continuation of U.S. application Ser. No. 11/530,147, filed Sep. 8, 2006, to be issued as U.S. Pat. No. 7,439,630, on Oct. 21, 2008, which is hereby incorporated by reference herein in its entirety.

BACKGROUND OF THE INVENTION

1. Field of the Invention

This invention relates broadly to mechanisms for generating electricity. More particularly, this invention relates to mechanisms for generating electricity using piezoelectric materials.

2. State of the Art

Piezoelectricity is the result of charge displacement within a crystalline structure which lacks a central symmetry. Piezoelectric elements when subjected to a mechanical load (e.g., vibration, compression, and/or flexing) induce an electrical charge on opposite faces of a piezoelectric material. In prior art piezoelectric elements have been used for actuators, transducers, resonators, transformers, micro generators, and sensors of all types. Recently piezoelectric elements have been researched and developed for energy scavenging. The piezoelectric element functions as a capacitor in response to stress or strain.

When a piezoelectric material is subjected to a compressive or tensile stress, an electric field is generated across the material, creating a voltage gradient and a subsequent current flow due to compressive or tensile stress which seeks equilibrium. The current flow is provided by a conductive material that allows the unequal charge of the piezoelectric material to equalize by moving the unequal charge off from the piezoelectric material. Piezoelectric materials generate high voltage and low current electricity. The piezoelectric effect is reversible in that piezoelectric material, when subjected to an externally applied voltage, can change shape. Direct piezoelectricity of some substances (e.g., quartz, Rochelle salt) can generate voltage potentials of thousands of volts.

Piezoelectric materials store energy in two forms, as an electrical field, and as a mechanical displacement (strain). The relationship between strain and the electric field is given by $SC=1/ST (SR-(d*e))$ where "SC" is the compliance of the piezoelectric element in a constant electric field, "SR" is the mechanical deformation and "d" is the piezoelectric charge constant. The charge produced when a pressure is applied is: $Q=d*P*A$, where P is the pressure applied and A is the area on which the pressure is applied. Utilizing multiple piezoelectric stacks on top of one another and connecting them in parallel increases the charge in relationship to pressure. The output voltage generated can be expressed as the total charge of the stack divided by the capacitance of the stack.

In the prior art, piezoelectric materials have been used to scavenge energy from vibration energy induced by wind, ocean waves, ambient sound, automobile traffic, the deformation of an automobile tire, and the foot strike of a human being on a floor. However, the prior art methodologies have resulted in very low power output, which makes such solutions suitable only for low power applications.

Thus, there remains a need in the art for systems and methodologies that generate electricity by applying pressure gradients to piezoelectric material in manner that is suitable for a wide range of power supply applications, such as residential or commercial power supply applications.

SUMMARY OF THE INVENTION

It is therefore an object of the invention to provide systems and corresponding methodologies that apply cyclic pressure gradients to piezoelectric material to generate corresponding electrical signals that can be used to generate electrical power suitable for a wide range of power supply applications, such as residential or commercial power supply applications.

It is another object of the invention to provide such systems and methodologies that utilize a chemical heat engine to apply the pressure gradients to the piezoelectric material.

It is another object of the invention to provide such systems and methodologies that utilize environmentally friendly, low-cost geothermal and ambient sources of hot and cold to power the chemical heat engine.

It is a further object of the invention to provide power generation systems and methodologies that convert electrical energy output by a piezoelectric source to mechanical energy stored by a rotating flywheel of an electro-mechanical battery, and that converts the mechanical energy stored by the flywheel to electrical energy for output therefrom.

It is also an object of the invention to provide efficient conversion of the electrical energy output by a piezoelectric source to mechanical energy stored by the rotating flywheel of the electro-mechanical battery.

In accord with these objects, which will be discussed in detail below, a system (and corresponding methodology) for generating electrical signals includes at least one heat engine having a chamber that undergoes a cycle of heating and cooling and corresponding pressure variations. At least one piezoelectric transducer, which is operably coupled to the heat engine, is deformed in response to the pressure variations of the heat engine. A power converter can be used to transform the electric signals generated in response to deformation of the at least one piezoelectric transducer to a desired electrical power supply signal. The heat engine preferably uses a geothermal source of cold and an ambient source of hot (typically used in the summer months), or vice-versa (typically used in the winter months).

It will be appreciated that the heat engine can readily be adapted to undergo large, high frequency pressure variations and thus produce large, high frequency stresses and corresponding large cyclical deformations of the piezoelectric transducer. Such deformations cause high voltage, low current pulses that are transformed by the power converter.

In the preferred embodiment, the power converter includes an electromechanical battery with a flywheel storing rotational energy and an electrostatic motor that adds rotational energy to the flywheel. A Marx generator can be used to generate a sequence of stepped-up voltage pulses to increase the repulsive forces that drive the electrostatic motor. The electromechanical battery can readily be adapted to provide power supply signals that are suitable for a wide variety of applications, such as residential or commercial power supply applications.

In the preferred embodiment, the heat engine uses hydrogen as a working fluid within its chamber as well as metal hydride material for absorbing and desorbing hydrogen during the cycle of heating and cooling of the heat engine. A phase change material can also be used. In another aspect, an apparatus for energy conversion includes an electromechanical battery and an electrostatic motor. The electromechanical battery includes a flywheel storing rotational energy. The electrostatic motor adds rotational energy to the flywheel.

BRIEF DESCRIPTION OF THE DRAWINGS

FIG. 1C is an exemplary Pressure-Temperature curve that illustrates the heating/cooling/pressure cycle of the heat engine of FIGS. 1A and 1B.

DETAILED DESCRIPTION OF THE PREFERRED EMBODIMENTS

Figure 1A:
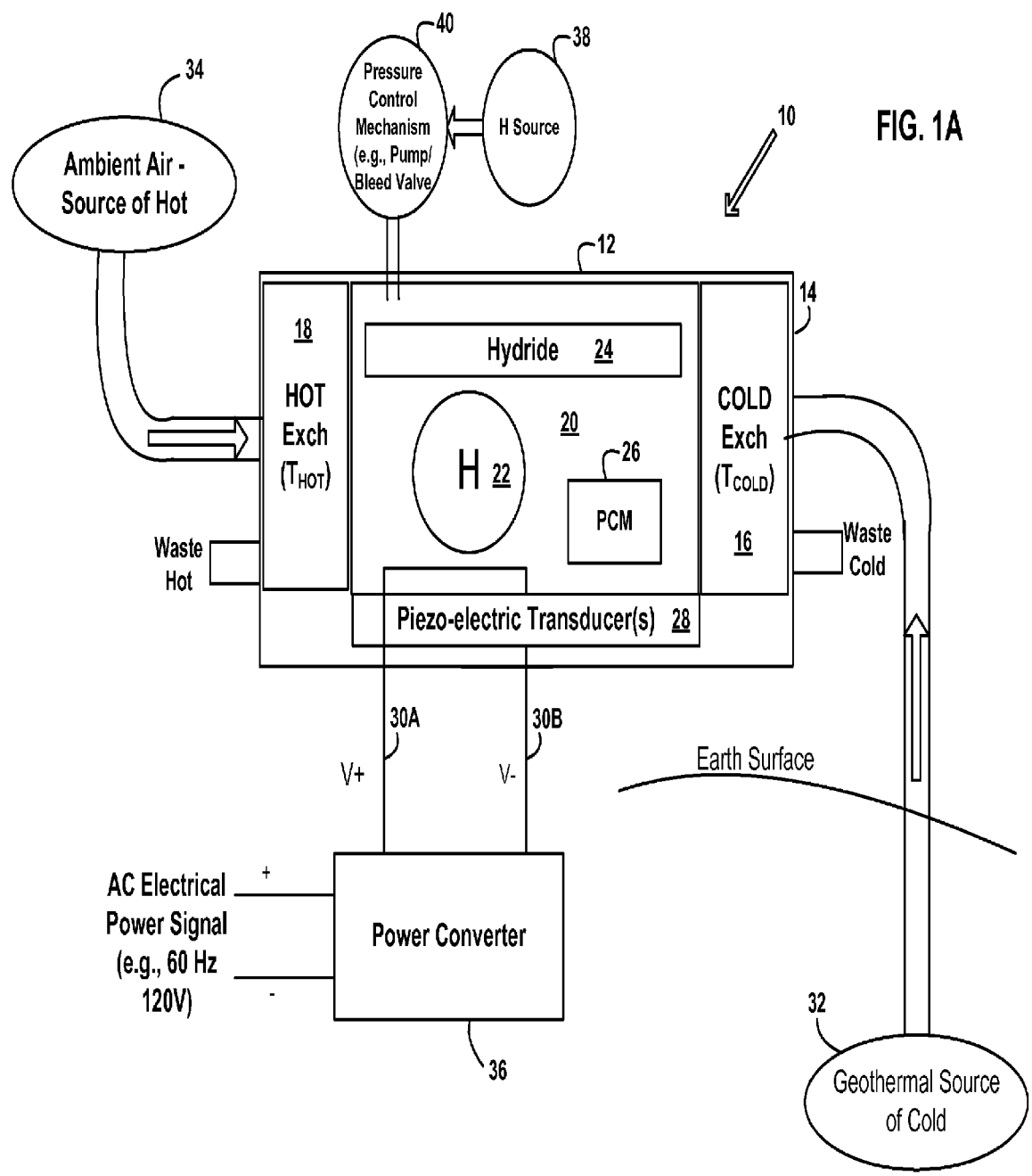
FIG. 1A is a block diagram of a piezoelectric power generator system in accordance the present invention working in one mode of operation.

Turning now to FIG. 1, there is shown a pictorial illustration of a piezoelectric energy generator system 10 in accordance with the present invention. The system 10 includes a geothermal exchange heat engine 12 that includes a housing 14 with a thermal insulating liner (not shown), which can be realized with a space filled with an aerogel or other suitable thermal insulating material. One end of the housing 14 supports a cold-side heat exchanger 16 (e.g., plate-type or tube-type heat exchanger) that is realized from a thermally conductive material such as copper, cooper alloys, stainless steel, or pyrolytic graphite. The other end of the housing 14 supports a hot-side heat exchanger 18 (e.g., plate-type or tube-type heat exchanger) that is also realized from a thermally conductive material such as copper, cooper alloys, stainless steel, or pyrolytic graphite. A sealed chamber 20 is disposed between the cold-side heat exchanger 16 and the hot-side heat exchanger 18. The chamber 20 is in thermal contact with both the cold-side heat exchanger 16 and the hot-side heat exchanger 18. The chamber 20 is filled with hydrogen working fluid 22. The chamber 20 also contains at least one metal hydride material 24 capable of hydrogen absorption and desorption and preferably at least one phase change material 26 in thermal contact with the hydrogen working fluid.

The at least one metal hydride material 24 is held in one or more beds or other storage container(s). The at least one metal hydride material may comprise:
 i) lithium nitride;
 ii) magnesium hydride;
 iii) lanthium nickel hydride (LaNi5H6), or modifications of lanthium nickel hydride by some substitution of either the La or Ni;
 iv) vanadium-based solid solution which have the general formula (V1−xTix)1−y My, where M is usually a Group VI to VIII metal such as Fe, Ni, Cr, or Mn; and/or
 v) Laves phase hydrides which have the general formula, AB2, where A is usually a rare earth, Group III or Group IV metal and B is usually a Group VIII metal, but may also be a metal from Groups V, VI or VII.

The at least one phase change material 26 is held in a storage container and may comprise zeolite, eutectic alloys, paraffins, organic compounds, salt hydrates, carbonates, nitrates, polyhydric alcohols and metals.

The heat engine 12 also includes one or more piezoelectric transducer elements 28 of piezoelectric material. The piezoelectric material can be quartz, Rochelle salt, barium titanate, zinc oxide, lead titanate, lead zirconate titanate, lead lanthanum zirconate titanate, lead magnesium niobate, potassium niobate, potassium sodium niobate, potassium tantalate niobate, lead niobate, lithium niobate, lithium tantalate, fluoride poly(vinylidene flouride or other suitable material. The piezoelectric transducer element(s) 28 can be disposed adjacent the chamber 20 in contact with the chamber wall or liner and in indirect contact with the hydrogen working fluid 22 such that pressure changes of the hydrogen working fluid 22 are applied to the piezoelectric transducer element(s) 28 to impart mechanical stress therein. Alternatively, the piezoelectric transducer element(s) 28 can be disposed within the chamber 20 (running lengthwise or width-wise, or both) in direct contact with the hydrogen working fluid 22 such that pressure changes of the hydrogen working fluid 22 are applied to the piezoelectric transducer element(s) 28 to impart mechanical stress therein. The piezoelectric transducer element(s) 28 can be configured as a diaphragm membrane, beam, plate, rod and/or fiber.

At least one pair of electrodes 30A, 30B are electrically coupled to the piezoelectric transducer element(s) 28. The electrodes 30A, 30B output electrical signals generated by the piezoelectric transducer element(s) as a result of the mechanical stress induced therein by pressure changes of the hydrogen working fluid 22.

A supply of cold fluid is supplied to the cold-side heat exchanger 16, and a supply of hot fluid is supplied to the hot-side heat exchanger 18. The supply of cold fluid preferably includes a circulator (e.g., pump, fan) for providing a continuous supply of cold fluid to the cold-side heat exchanger 16 over multiple heating/cooling cycles of the heat pump engine 12. The supply of hot fluid preferably includes a circulator (e.g., pump, fan) for providing a continuous supply of hot fluid to the hot-side heat exchanger 18 over multiple heating/cooling cycles of the heat engine 12. In one mode of operation shown in FIG. 1A, when the ambient air is warmer than the deep ground temperature, the supply of cold fluid is produced by a geothermal source of cold 32 and the supply of hot fluid is produced from ambient air 34. The geothermal source of cold 32 can be ground water that is extracted from a well or a body of water (e.g., pond or lake). It can also be a fluid, such as water or air, which is cooled as it passes through a conduit in thermal contact with the ground. In a second mode of operation shown in FIG. 1B, when the deep ground temperature is warmer than the ambient air, the supply of cold fluid supplied to the cold-side heat exchanger 16 is produced from ambient air 32', while the supply of hot fluid to the hot-side heat exchanger is produced by a geothermal source of "hot" 34'. The geothermal source of hot 34' can be ground water that is extracted from a well or a body of water (e.g., pond or lake). It can also be a fluid, such as water or air, that is heated as it passes through a conduit in thermal contact with the ground. It will be appreciated that valves and pipes may be utilized to permit the system to switch between modes depending upon the relative temperatures of the sources.

Where the geothermal source is a source of cold thermal energy, thermo-acoustic refrigeration can also be used to further the efficiency of the system. In particular, an acoustic source capable of generating a shock wave may be placed in a subterranean well and operably coupled to the hot-side and/or cold side heat exchangers of the engine. Acoustic refrigeration is a form of heat pump that uses sound waves to either increase temperature or reduce temperature. Generally, a container filled with a working fluid is submerged within a subterranean well. An acoustic transducer generates a shockwave, which compresses the gas in front of the shockwave while reducing the density of the gas behind the shockwave. As the gas is compressed by the shockwave, the temperature of the gas increases. As the gas is expanded behind the shockwave, the temperature of the gas decreases. The heated compressed gas in front of the shockwave can be used as a source of hot for supply to the hot-side heat exchanger 18 of the engine 12. The cool area behind the shockwave can be used as a source of cold for supply to the cold-side heat exchanger 16 of the engine 12.

A fluid supply source 38 and a pressure control mechanism 40 can be provided. The fluid supply source 38 and the pressure control mechanism 40 cooperate to add working fluid 22 to the chamber 20 and adjust the pressure of the working fluid 22 in the chamber 20 as needed. When hydrogen is used as the working fluid, the fluid supply source 38 can be realized by a vessel of hydrogen or possibly an apparatus for producing hydrogen by electrolysis of water. The pressure control mechanism 40 can be realized by a pump and valve assembly, which can possibly include a bleed valve for bleeding excess pressures to the ambient environment as needed.

The heat engine 12 generally operates as follows. In a continuous manner, the source of cold 32 continuously supplies cold fluid to the cold-side heat exchanger 16 and the source of hot 34 continuously supplies hot fluid to the hot-side heat exchanger 18. The temperature differential is utilized to generate work. More particularly, and as described in more detail hereinafter with reference to FIG. 1C, the temperature difference is used to cause the temperature of the hydrogen working fluid, the metal hydride(s) and the phase change material(s) (if any) in the chamber 20 to cycle in order to induce pressure changes therein. The pressure changes in the chamber 20 apply corresponding compressive and decompressive forces on the piezoelectric transducer element(s) 28, which induces mechanical stress therein. In response to such mechanical stress, the piezoelectric transducer element(s) 28 are deformed in a cyclical manner. Such cyclical deformation causes the piezoelectric material to generate a sequence of high voltage, low current electrical pulses (V+, V−) that are output by the electrode(s) 30A, 30B electrically connected thereto.

Figure 1B:
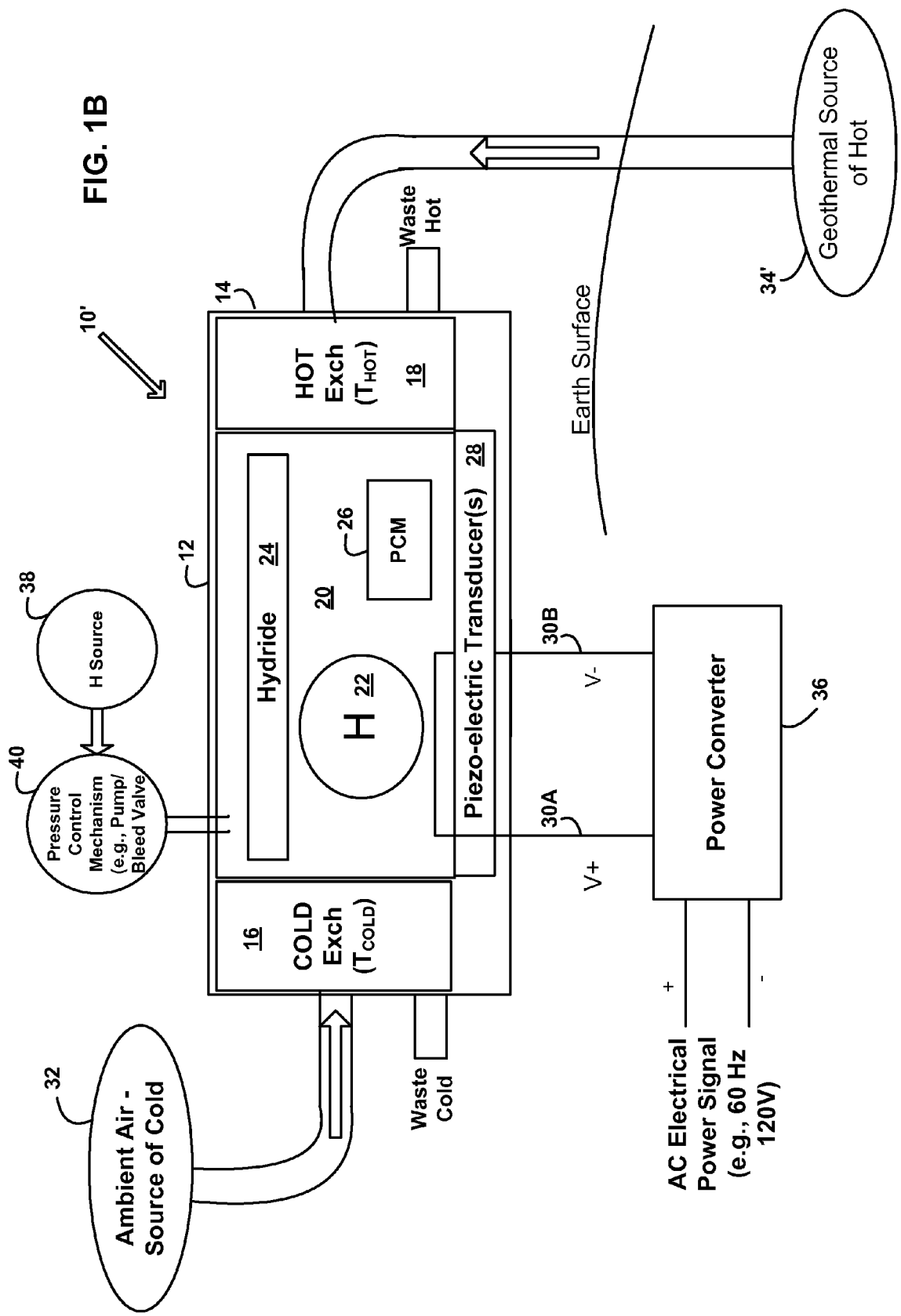
FIG. 1B is a block diagram of a piezoelectric power generator system in accordance the present invention working in a second mode of operation.

FIG. 1C illustrates an exemplary compression-decompression cycle of the heat engine 12 of FIGS. 1A and 1B, although it should be appreciated that the cycle seen is merely schematic and not to scale. The cycle includes 4 segments AB, BC, CD, DA. For purposes of explanation, it is assumed that the engine 12 starts at a temperature and pressure near point A, which is preferably accomplished by controlling adjusting the pressure of the working fluid 22 within the vessel by operation of the pressure control mechanism 40. It is also assumed that the engine 12 has a characteristic temperature $T_{INT}$ whereby:

i) for temperature $T_{INT}$, heat flowing into the chamber 20 from the hot-side heat exchanger 18 is substantially equal to the heat flowing out of the chamber 20 to the cold-side heat exchanger 16, which causes the temperature gradient within the chamber 20 to remain substantially constant;

ii) for temperatures below $T_{INT}$, heat flowing into the chamber 20 from the hot-side heat exchanger 18 exceeds heat flowing out of the chamber 20 to the cold-side heat exchanger 16, which causes the temperature gradient within the chamber 20 to increase; and iii) for temperatures above $T_{INT}$, heat flowing out of the chamber 20 from the cold-side heat exchanger 16 exceeds the heat flowing into the chamber 20 from the cold-side heat exchanger 18, which causes the temperature gradient within the chamber 20 to decrease.

The characteristic temperature $T_{INT}$ is dictated by the temperature of the hot-side heat exchanger and cold-side heat exchanger ($T_{HOT}$ and $T_{COLD}$), the relative thermal conductivity of the hot-side and cold-side heat exchangers, the relative size of the hot-side and cold-side heat exchangers.

Segment AB—Compression of Piezoelectric Transducer Element(s)

During segment AB, heat flowing into the chamber 20 from the hot-side heat exchanger 18 dominates heat flowing out of the chamber 20 to the cold-side heat exchanger 16, which causes the temperature gradient within the chamber 20 to increase. Such heat increases the temperature of the hydrogen working fluid 22, which causes a corresponding increase of the pressure within the chamber 20 as shown. The volume of the hydrogen working fluid 22 remains substantially constant. The heat flow into the chamber 20 will cause the temperature and pressure within the sealed chamber to reach point B, which is the critical pressure/temperature point for absorption of hydrogen by the metal hydride material(s) 24. Some time at or before this point, if a phase change material is present in the chamber, the material will absorb heat and change phase, thereby storing thermal energy. In any event, at the critical pressure/temperature point for the absorption of hydrogen by the metal hydride, segment BC begins.

Segment BC—Hydrogen Absorption by Metal Hydride(s)

During segment BC, the metal hydride material(s) 24 absorb the hydrogen working fluid 22. This absorption is an exothermic reaction, which releases heat and maintains the pressure of the hydrogen working fluid 22 substantially constant at the critical pressure. During the absorption reaction, the pressure within the chamber 20 is maintained at a relatively constant pressure, which corresponds to the critical pressure of the metal hydride material(s) 24. The absorption reaction continues until the metal hydride material(s) 24 is(are) saturated. Upon saturation, the heat that was released earlier during the exothermic reaction can cause a spike or increase in the temperature of the chamber 20 and thus cause a corresponding increase/spike in pressure to a Point C as shown. At this point, segment CD begins.

Segment CD—Decompression of Piezoelectric Element(s)

During segment CD, heat flowing out of the chamber 20 from the cold-side heat exchanger 16 dominates the heat flowing into the chamber 20 from the cold-side heat exchanger 18, which causes the temperature gradient within the chamber 20 to decrease. This causes the temperature of the hydrogen working fluid 22 and a corresponding decrease of the pressure within the chamber 20 to decrease as shown. When the temperature and pressure of the chamber 20 drop below a critical temperature and pressure for hydrogen desorption (point D), segment DA begins.

Segment DA—Hydrogen Desorption by Hydride

When the temperature and pressure within the chamber 20 drop below the critical temperature and pressure point D, the metal hydride material(s) desorbs hydrogen by an endothermic reaction that absorbs heat, thereby accelerating the decrease in temperature of the chamber 20 and the cooling mode cycle time. In addition, where phase change material is present, the phase change material releases its thermal energy and reverts to its original phase. The segment DA continues until point A where the hot-side heat exchanger 18 can support an increase in the temperature of the hydrogen working fluid 22. At that point the cycle restarts.

The pressure level increases from $P_{MIN}$ to $P_{MAX}$ during the cycle as shown to apply corresponding compressive forces and stress on the piezoelectric transducer element(s) 28. The pressure level decreases from $P_{MAX}$ to $P_{MIN}$ during the cycle as shown to apply corresponding decompressive forces and stress on the piezoelectric transducer element(s) 28. The alternating compressive/decompressive forces and stress applied to the piezoelectric transducer element(s) 28 during successive heating and cooling cycles of the heat engine 12 causes deformation of the piezoelectric transducer element(s) 28 in a cyclical manner. Such cyclical deformation of the piezoelectric material generates a sequence of high voltage, low current electrical pulses that are output by the electrode(s) 30A, 30B electrically connected thereto.

As previously mentioned, one or more phase change materials 26 may be used as part of the heat engine 12 as described above. The phase change material(s) 26 are disposed in thermal contact with the hydrogen working fluid 22. The phase change material(s) 26 is(are) tuned to absorb heat at or near the temperature of Point B for absorption of hydrogen working fluid 22 by the metal hydride material(s) 24, and release heat during the desorption of hydrogen working fluid 22 by the metal hydride material(s) 24 during segment DA. This aids in reducing the cycle time of the heat engine 12 and the power generated by the heat engine 12.

The preferred embodiment of the system 10 includes a power converter 36 that converts the electrical signals output by the piezoelectric transducer element(s) 28 over the electrode pair(s) 30A, 30B into a desired electrical output form. The electrical output produced by the power converter 36 can be adapted for a wide range of power supply applications, such as residential or commercial power supply applications. It can be an AC power supply signal or a DC power supply signal. In the preferred embodiment, the electrical output produced by the power converter 36 is a standard AC power supply signal typically supplied by mains power (e.g., a 60 Hz 120V AC electrical supply signal).

Figure 2:
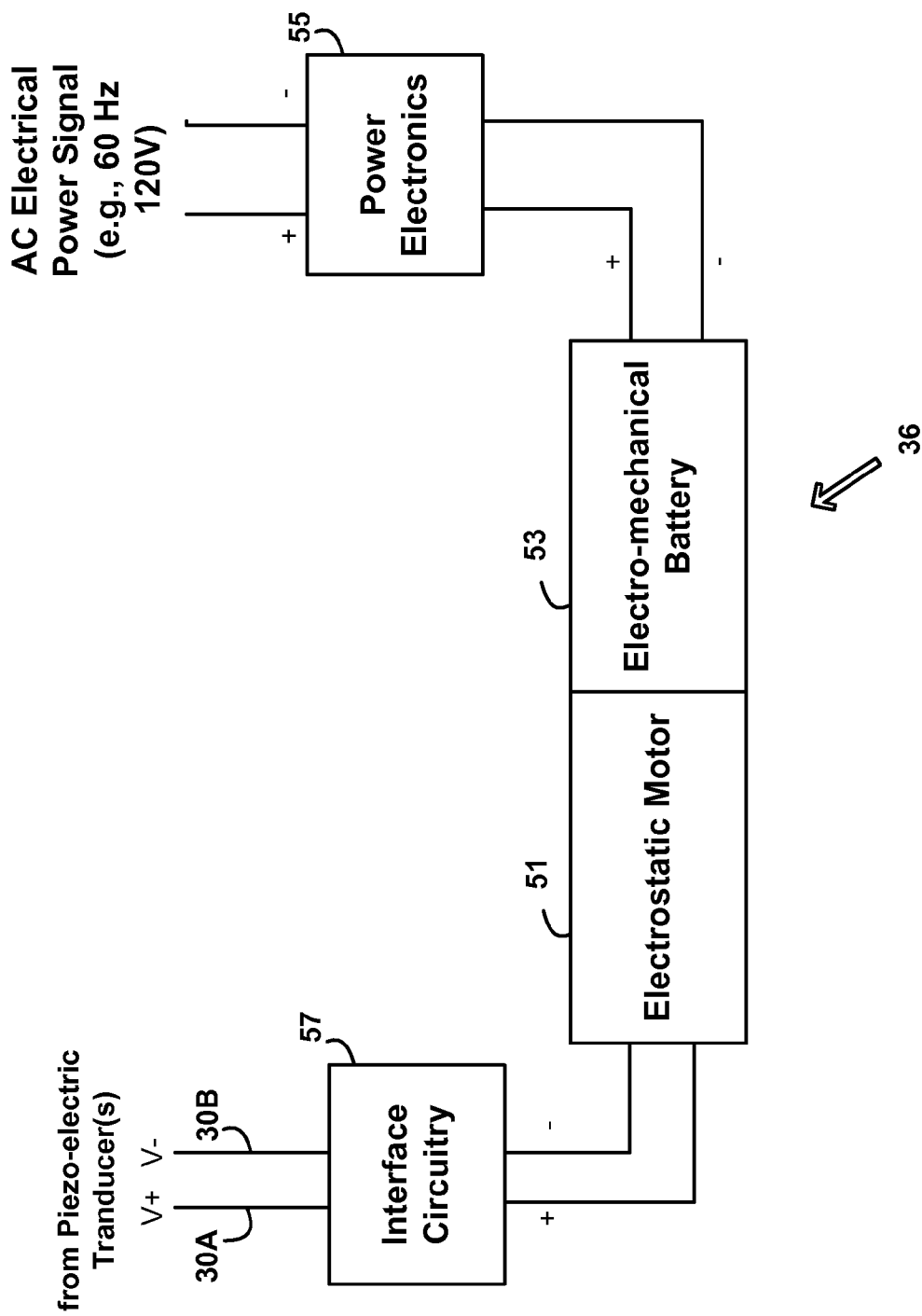
FIG. 2 is a functional block diagram of an exemplary power conversion apparatus for use in the system of FIGS. 1A and 1B.
Figure 3:
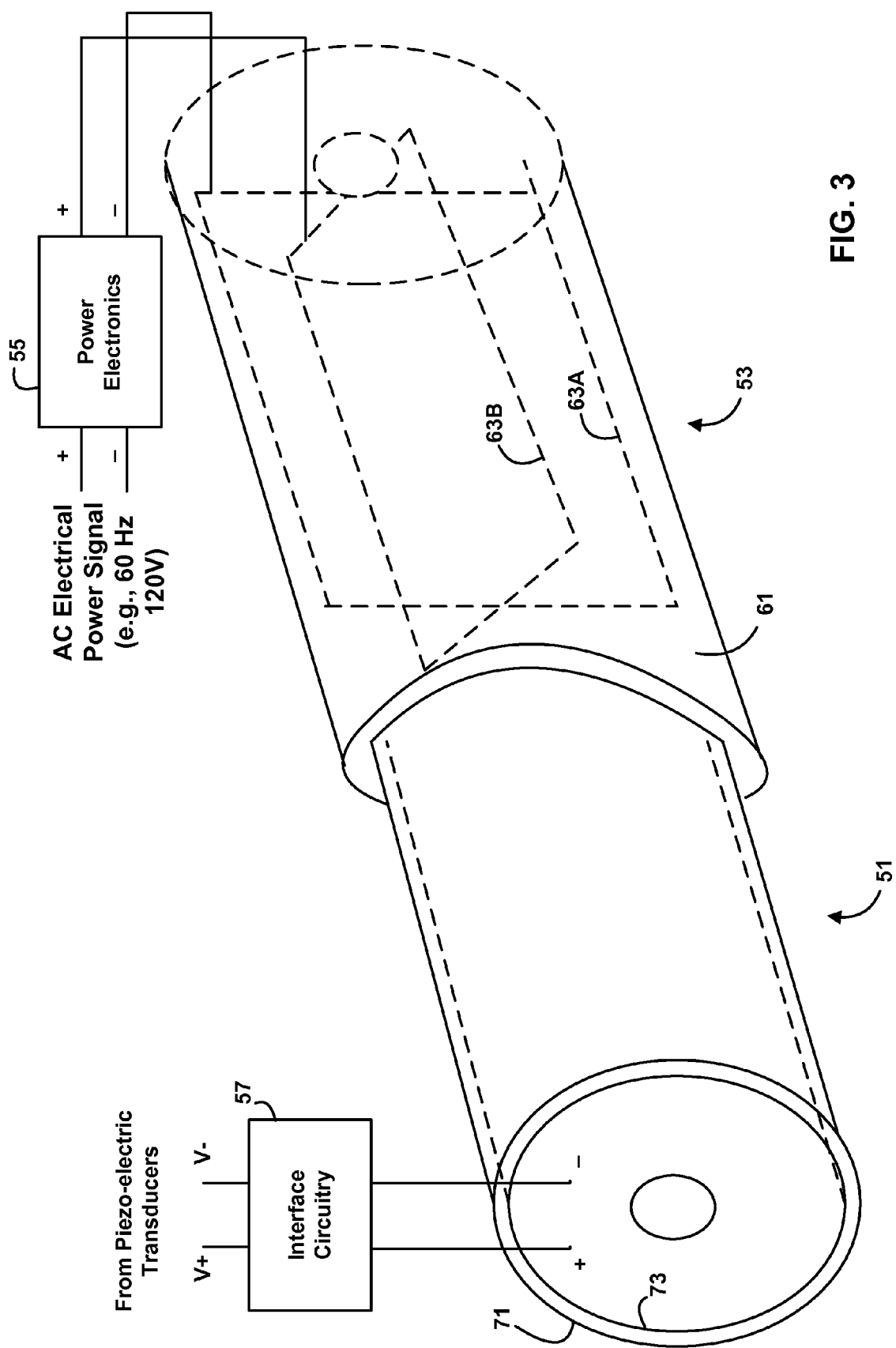
FIG. 3 is a schematic diagram of the power conversion apparatus of FIG. 2.

As depicted schematically in FIG. 2, the power converter 36 is preferably realized by an assembly that includes an electrostatic motor 51 and an electro-mechanical battery 53. As best shown in FIG. 3, the electro-mechanical battery 53 includes a cylindrical rotor 61 with an array of permanent magnets that provide a uniform dipole field (i.e., Halbach array). A high-speed flywheel is integral to the rotor 61. The rotor and flywheel are suspended on magnetic bearings (or other suitable low friction supports) and spin in vacuo, inside a hermetically sealed chamber. The high speed flywheel is used for energy storage and extraction. Stator windings 63A, 63B are disposed within the interior space of the cylindrical rotor 61. The stator windings 63A, 63B are inductively coupled to the magnetic field provided by the rotating array of magnets of the rotor 61. Power electronics 55 interface to stator windings 63A, 63B to extract energy from the rotating flywheel and convert such energy into the desired electrical power supply signal that is output therefrom. The electro-mechanical battery 53 is similar to that described in U.S. Pat. Nos. 5,705,902 and 6,396,186, herein incorporated by reference in their entirety.

Rotational energy is added to the flywheel of the electro-mechanical battery 53 by operation of an electrostatic motor 51. Turning to FIG. 3 in conjunction with FIG. 4, the electrostatic motor 51 includes a cylindrical rotor 71 configured to have multiple conductive regions 72 evenly spaced about its interior surface and electrically insulated from one another. The rotor 71 of the electrostatic motor 51 is suspended on magnetic bearings (or other suitable low-friction supports) and is coupled to the rotor 61 of the electro-mechanical battery 53 such that rotation of the rotor 71 causes rotation of the rotor 61 of the electro-mechanical battery 53. A stator assembly 73 is disposed within the interior space of the cylindrical rotor 71.

Figure 4:
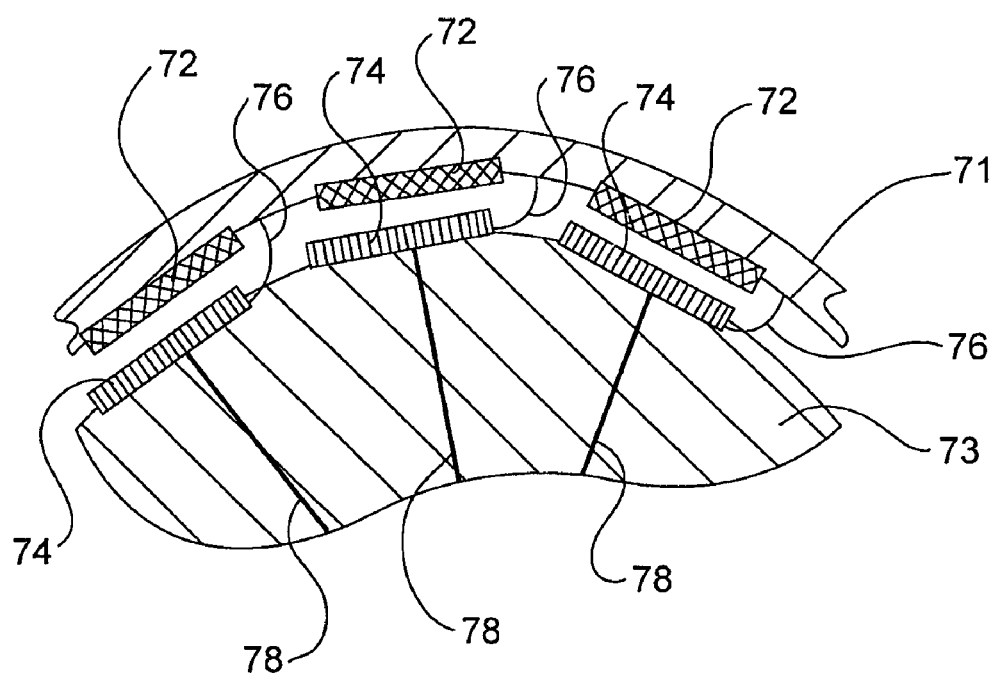
FIG. 4 is a cross-section schematic illustrating components of the electrostatic motor of FIG. 3.

As shown in FIG. 4, the stator assembly 73 supports a plurality of electrodes 74 that are evenly spaced apart from one another such that they lie in close proximity to the conductive regions 72 of the rotor 71. Contact brushes 76 extend from the stator assembly 73 (or possibly from the stator electrodes themselves 74). The contact brushes 76 are electrically connected to corresponding stator electrodes 74 and extend radially outward to contact the conductive regions 72 of the rotor 71. A conductor 78 extends along the arms of the stator from the electrodes to the base. The conductors 78 and electrodes 74 of the stator assembly 73 are logically partitioned into two groups (e.g., positive and negative polarities). The positive and negative polarity electrodes 74 are disposed one after the other in alternating fashion about the periphery of the stator assembly 73. The positive polarity electrodes of the stator assembly 73 are charged with a positive voltage potential, while the negative polarity electrodes of the stator assembly 73 are charged with a negative voltage potential. This configuration allows repulsive Coulomb forces between the electrodes 74 of the stator assembly 73 and the conductive regions 72 of the rotor 71 to induce rotation of the rotor 71.

In an alternate embodiment, the contact brushes 76 can be omitted and corona discharge across the medium between the stator electrodes 74 and the conductive regions 72 of the rotor 71 can be used to deposit charge on the conductive regions 72 of the rotor 71. This configuration also results in alternately charged regions of the rotor, which repel the neighboring like-charged stator electrodes.

Referring now to FIGS. 2 and 3, interface circuitry 57 is provided between the electrode pair(s) 30A, 30B of the piezoelectric transducer element(s) 28 and the conductors 78 of the stator assembly 73. The interface circuitry 57 transfers the electrical energy output from the piezoelectric transducer element(s) 28 to the conductors 78 and electrodes 74 of the stator assembly 73 in order to induce rotation of the rotor 71.

Figure 5:
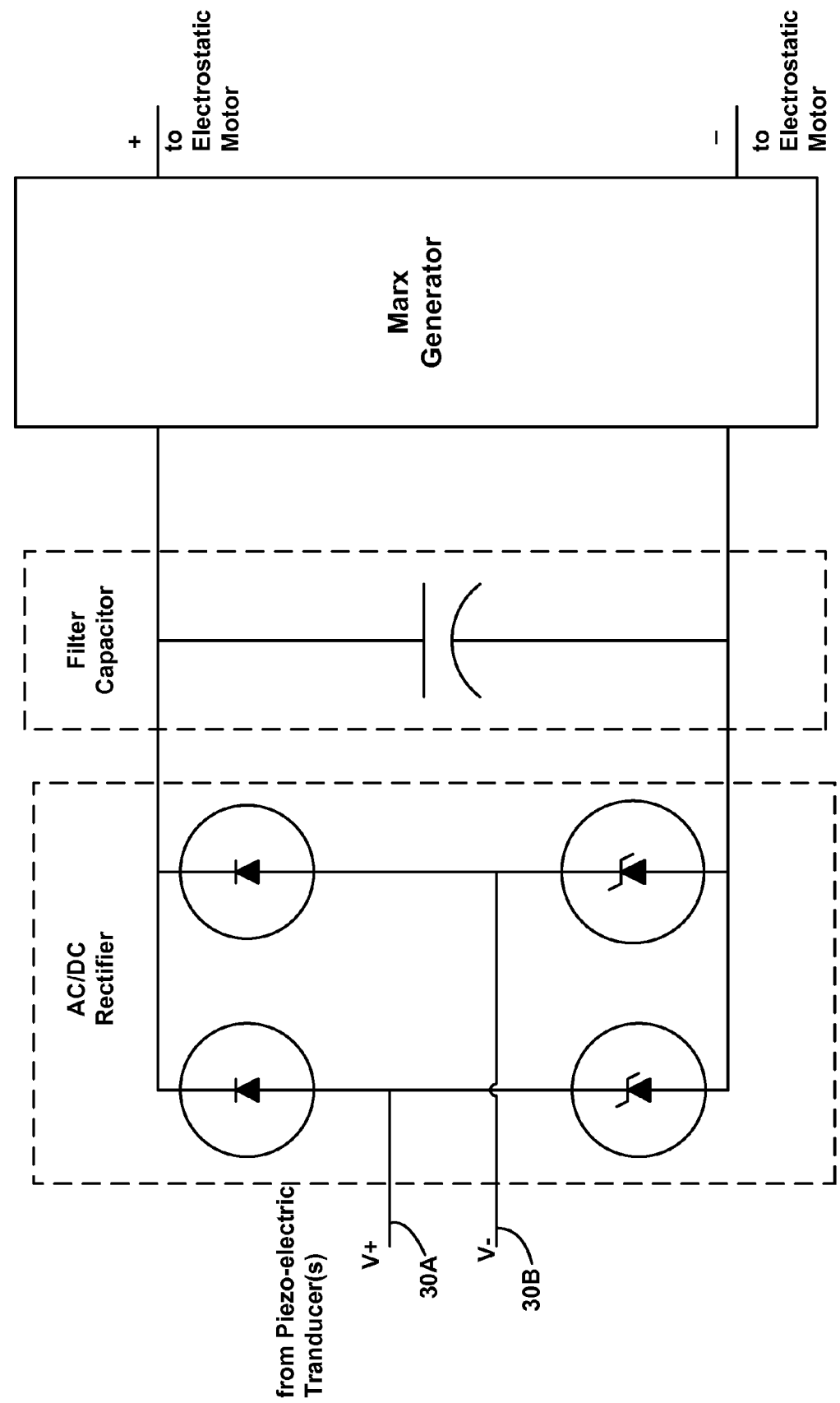
FIG. 5 is a schematic diagram of the interface circuitry of FIG. 3

As shown in FIG. 5, the interface circuitry 57 preferably includes an AC/DC rectifier, a filter capacitor, and a Marx generator circuit as shown. The AC/DC rectifier converts the AC signal output from the piezoelectric transducer element(s) 28 into DC current, the filter capacitor smoothes the resultant signal to generate a DC charging signal, and the Mark generator circuit converts the DC charging signal to a high voltage pulse.

Figure 6:
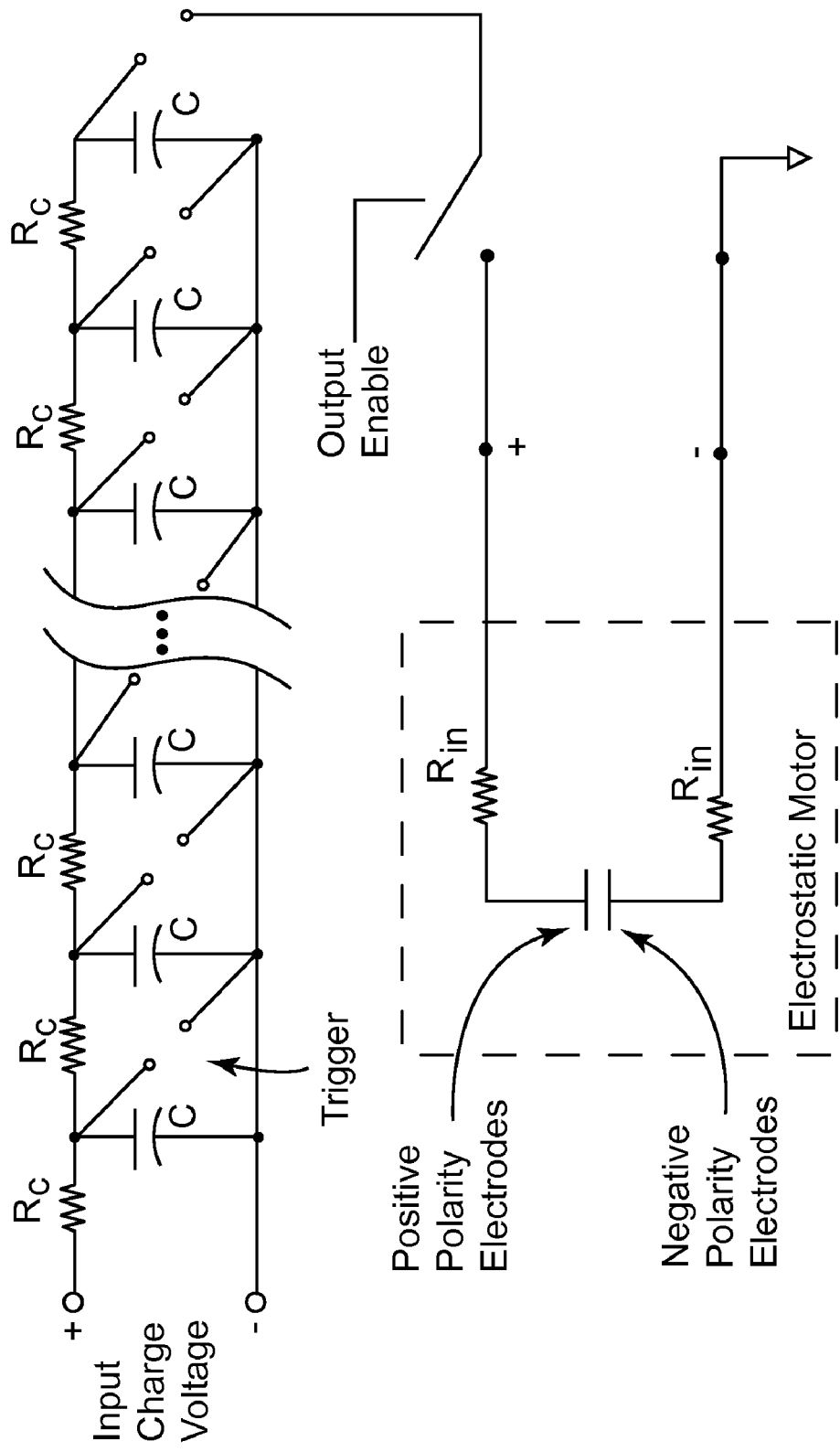
FIG. 6 is a schematic diagram of the Marx generator circuit of FIG. 5.

The Marx generator circuit, which was first described by Erwin Marx in 1924, generates a high voltage pulse. As shown in FIG. 6, a number of capacitors are charged in parallel to a given voltage, V, and then connected in series by spark gap switches, ideally producing a voltage of V multiplied by the number, n, of capacitors (or stages). Due to various practical constraints, the output voltage is usually somewhat less than n*V. In the ideal case, the closing of the switch closest to the charging power supply applies a voltage 2*V to the second switch. This switch will then close, applying a voltage 3*V to the third switch. This switch will then close, resulting in a cascade down the generator (referred to as erection) that produces n*V at the generator output (again, only in the ideal case). The first switch may be allowed to spontaneously break down (sometimes called a self break) during charging if the absolute timing of the output pulse is unimportant. However, it is usually intentionally triggered by mechanical means (reducing the gap distance), triggered electrically, triggered via a pulsed laser, or by reducing the air pressure within the gap after all the capacitors have reached full charge. The charging resistors, Rc, are sized for both charging and discharging. The charging resistors can be replaced with inductors for improved efficiency and faster charging.

In an alternate embodiment, the electrostatic motor 51 and its supporting circuitry can be substituted by components that transform the electrical energy provided by the output of the piezoelectric transducer element(s) 28 to electromagnetic forces that induce rotational energy of the rotor 61 of the electromechanical battery 53 and thus add rotational energy to the flywheel of the electromechanical battery. For example, the high voltage, low current electrical signals generated by the piezoelectric transducer element(s) 28 can be supplied to an interface circuit that cooperates with additional stator windings of the electro-mechanical battery (or possibly to the same stator windings used for energy extraction in a phased design) to generate a magnetic field that is inductive coupled to the magnetic field provided by the rotating array of magnets of the rotor 61 of the electro-mechanical battery 53 in order to induce rotation of its rotor 61 and add rotational energy to its flywheel.

Figure 7:
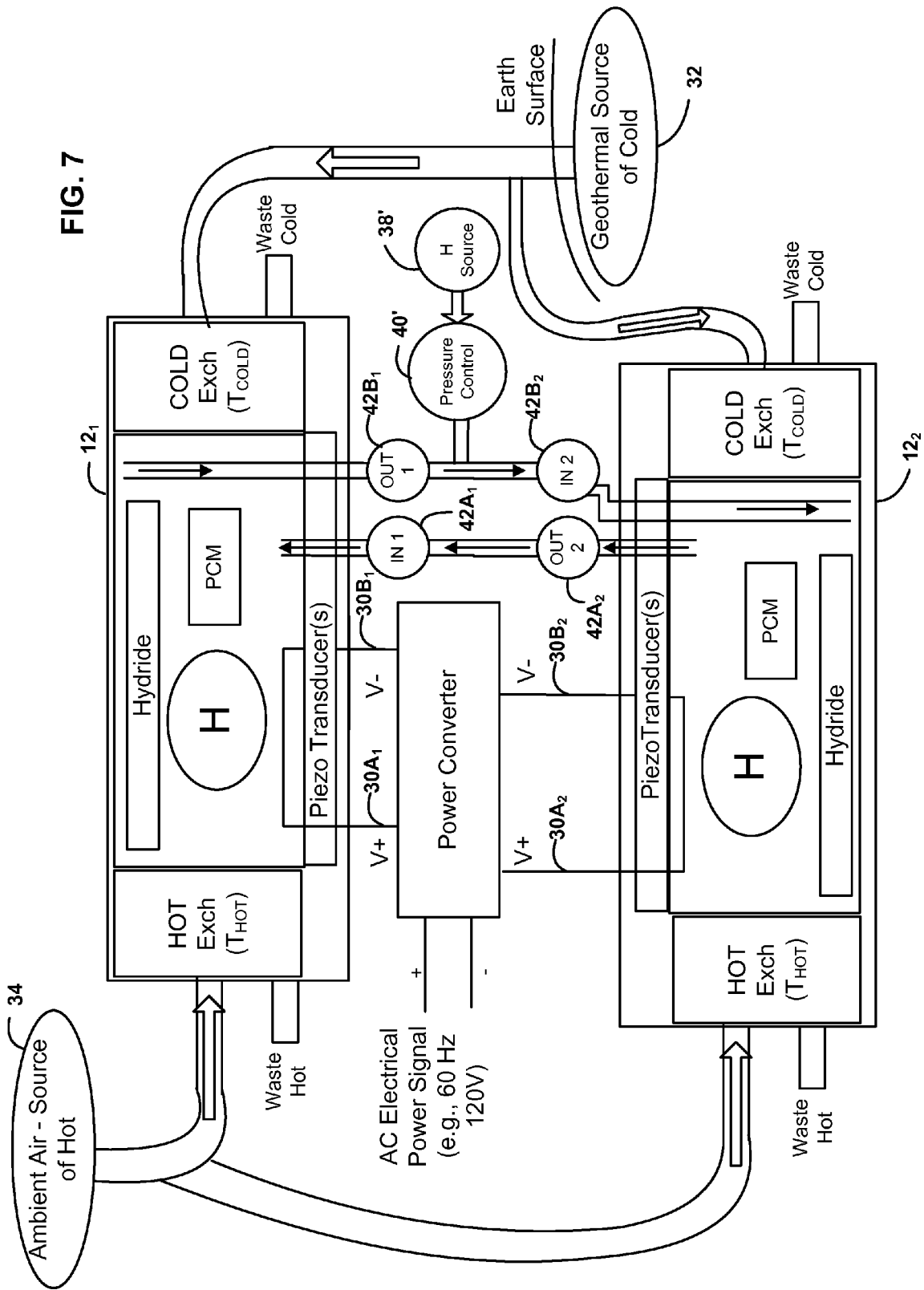
FIG. 7 is a block diagram of an alternate embodiment piezoelectric power generator system in accordance the present invention working in one mode of operation.

FIG. 7 illustrates an alternate embodiment of the present invention, which includes two heat engines $12_1$ and $12_2$ whose chambers are fluidly coupled together by two fluid lines. One of the fluid lines carries working fluid from the chamber of heat engine $12_1$ to the chamber of heat engine $12_2$, while the other fluid line carries working fluid from the chamber of heat engine $12_2$ to the chamber of heat engine $12_1$. Flow control valves $42A_1$, $42A_2$, $42B_1$, $42B_2$ are disposed at the input and output of the two fluid lines for the respective chambers. A fluid supply source 38' and a pressure control mechanism 40' are fluidly coupled to one of the two fluid lines between the respective input and output valves as shown. The fluid supply source 38' and the pressure control mechanism 40' cooperate to add working fluid 22 to the chambers of the two engines and adjust the pressure of the working fluid in the chambers of the two engines as needed. When hydrogen is used as the working fluid, the fluid supply source 38' can be realized by a vessel of hydrogen or possibly an apparatus for producing hydrogen by electrolysis of water. The pressure control mechanism 40' can be realized by a pump and valve assembly, which can possibly include a bleed valve for bleeding excess pressures to the ambient environment as needed. The input and output valves can be open and closed as needed to adjust the amount/pressure of working fluid in each one of the chambers. For example, in the configuration shown, the pressure of the chamber for the engine $12_1$ can be adjusted by opening the output valve $42B_1$ and closing the other valves $42B_2$, $42A_1$, $42A_2$. Similarly, the pressure of the chamber for the engine $12_2$ can be adjusted by opening the output valve $42B_2$ and closing the other valves $42B_1$, $42A_1$, $42A_2$.

During normal operation, the valves $42A_1$, $42A_2$, $42A_1$, $42A_2$ are opened and the two heat engines $12_1$, $12_2$ are operated such that their heating and cooling cycles are out of phase with one another. Consider for example that the heat engines $12_1$ and $12_2$ are both configured to carry out the heating and cooling cycle of FIG. 1C. In this configuration, the initial pressure of the heat engine $12_1$ can be initialized to begin operation at or near point C, while the initial pressure of the heat engine $12_2$ can be initialized to begin operation at or near point A. The heat engines $12_1$ and $12_2$ cycle through their heating and cooling cycles as follows:

| Heat Engine $12_1$ | Heat Engine $12_2$ |
|---|---|
| Segment CD | Segment AB |
| Segment DA | Segment BC |
| Segment AB | Segment CD |
| Segment BC | Segment DA |

This configuration is advantageous because it reduces the heating and cooling cycle time and thus increases the frequency of the pressure variations produced by the chemical heat engines.

Figure 8:
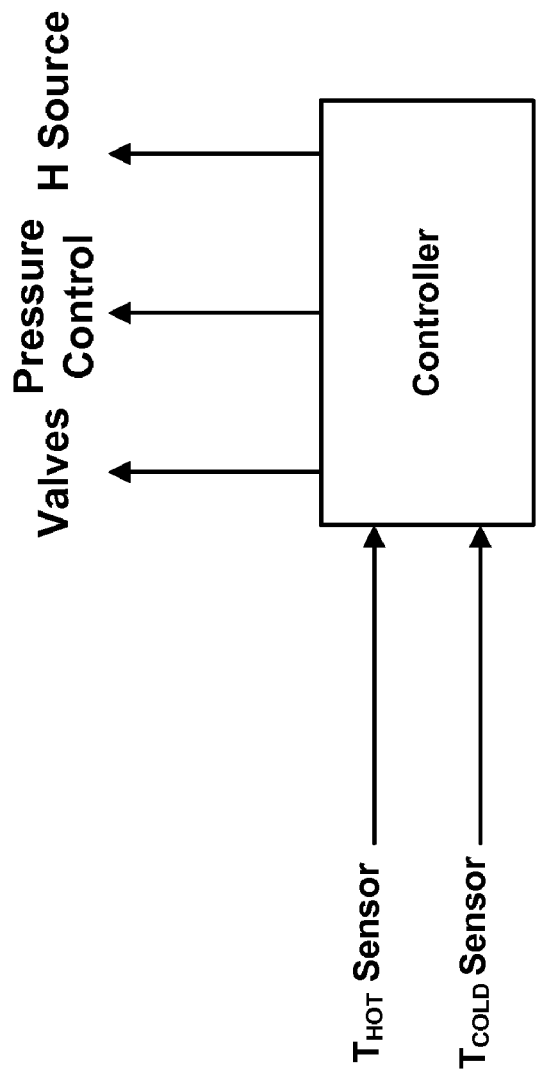
FIG. 8 is a block diagram of a controller that carries out automatic pressure adjustments to the chambers of the heat engines of FIG. 7.

FIG. 8 shows a schematic illustration of a pressure controller. The pressure controller can be used to automatically adjust and maintain the working fluid pressures within the chambers of the heat engines in their desired operating range. Such control may be necessary if hydrogen leaks from the system and/or to accommodate changing temperatures for the supply of hot and/or cold (e.g., changing ambient air temperatures). The controller is preferably interfaced to temperature sensors that measure the temperature of the hot and cold supply as well as to the actuation/control function of the valves 42A1, 43A2, 42B1, 43B2, the fluid supply source 38' and the pressure control mechanism 40'. The controller implements a control algorithm (preferably using a look-up table or the like) that calculates the appropriate chamber pressure level(s) based on the temperature of the hot and cold supply as output by the temperature sensors. The controller then automatically cooperates with the actuation/control function of the valves 42A1, 43A2, 42B1, 43B2, the fluid supply source 38' and the pressure control mechanism 40' as needed to adjust pressure of the chambers to the desired pressure level. A similar control scheme can be used to automatically adjust the pressure within the single engine configuration of FIGS. 1A and 1B.

Figure 9A:
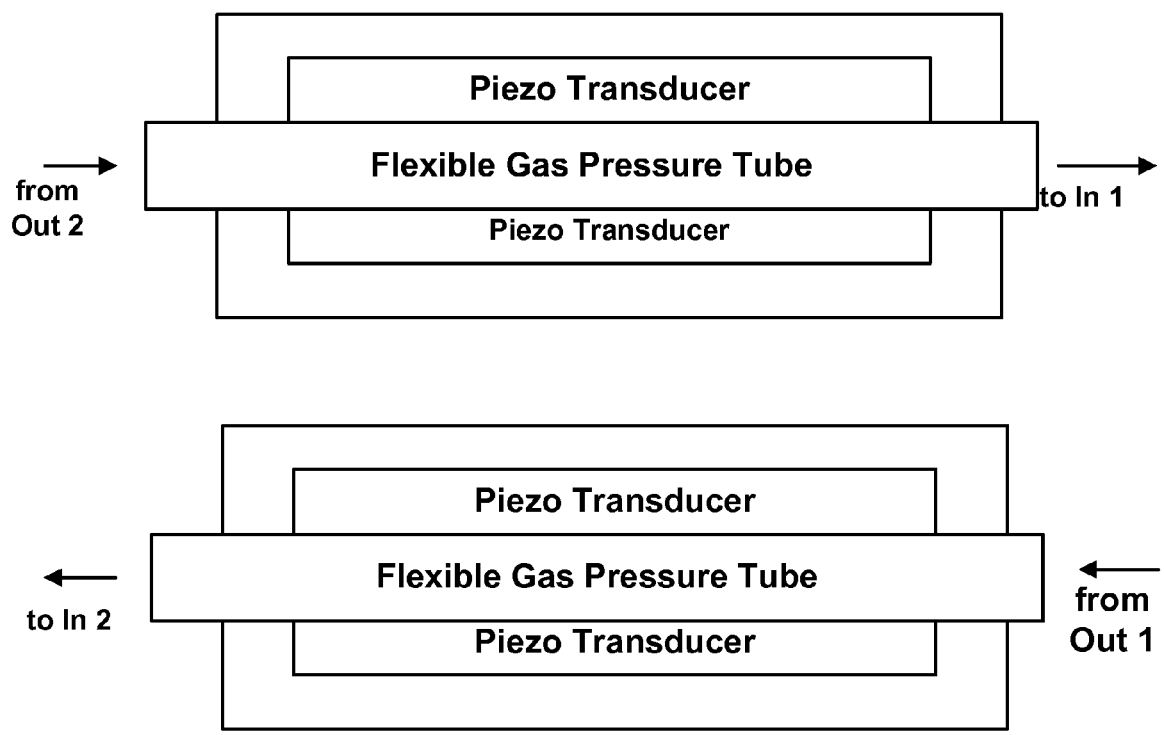
FIGS. 9A and 9B are schematic diagrams of tube-in-tube designs for the fluid supply paths that fluidly couple the heat engines of FIG. 7.

FIG. 9A illustrates an embodiment for the system of FIG. 7 wherein the fluid supply lines that fluidly couple the two engines are realized by a tube-in-tube design. The outer tube supports the one or more piezoelectric transducer elements 28' of the respective engine. The inner tube is a flexible gas pressure tube that is fluidly coupled between the chambers of the engine and thus become extensions of such chambers. During the heating/cooling/pressure cycles of the two engines, the oscillating pressure variations generated by the two engines will flow through the flexible gas pressure tubes, which applies corresponding compressive/decompressive forces to the one or more piezoelectric transducer elements 28' as described herein. In this configuration, the piezoelectric transducer element(s) 28' of the respective engine can be remotely located with respect to the vessel containing the hydride material and PCM material of the engine.

Figure 9B:
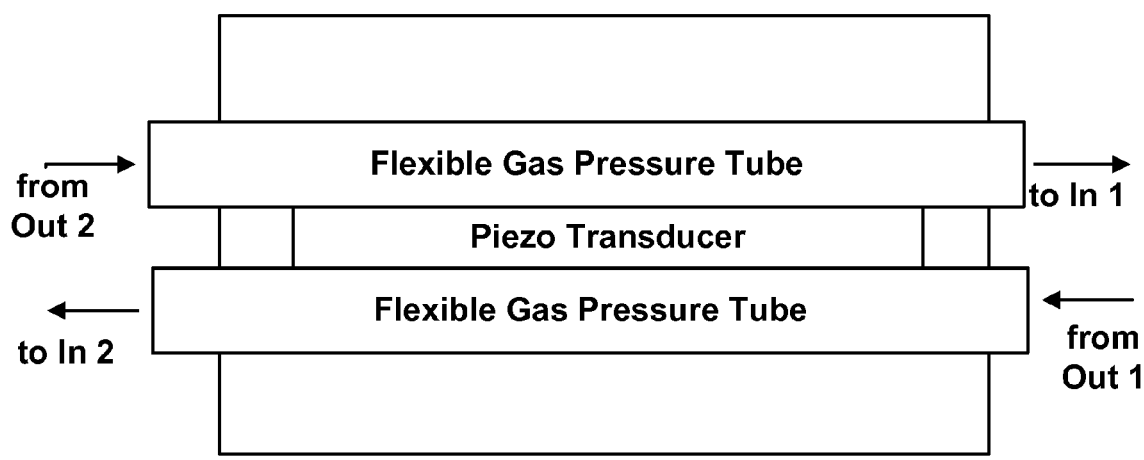

FIG. 9B illustrates another embodiment for the system of FIG. 7 wherein the fluid supply lines that fluidly couple the two engines are realized by a novel tube-in-tube design. An outer tube supports two inner tubes with one or more piezoelectric transducer elements therebetween. The two inner tubes are fluidly coupled between the chambers of the two engines and thus become extensions of such chambers. During the heating/cooling/pressure cycles of the two engines, the oscillating pressure variations generated by the two engines will flow through the flexible gas pressure tubes. Such pressure variations are preferably out of phase with one another and thus provide an oscillating pressure differential therebetween. This oscillating pressure differential is used to apply compressive/decompressive forces that deform the piezoelectric transducer element(s) disposed between the two flexible gas pressure tubes (for example, by oscillating deformation of a piezoelectric diaphragm). In this configuration, the piezoelectric transducer element(s) of the respective engine can be remotely located with respect to the vessel containing the hydride material and PCM material of the engine.

Figure 10:
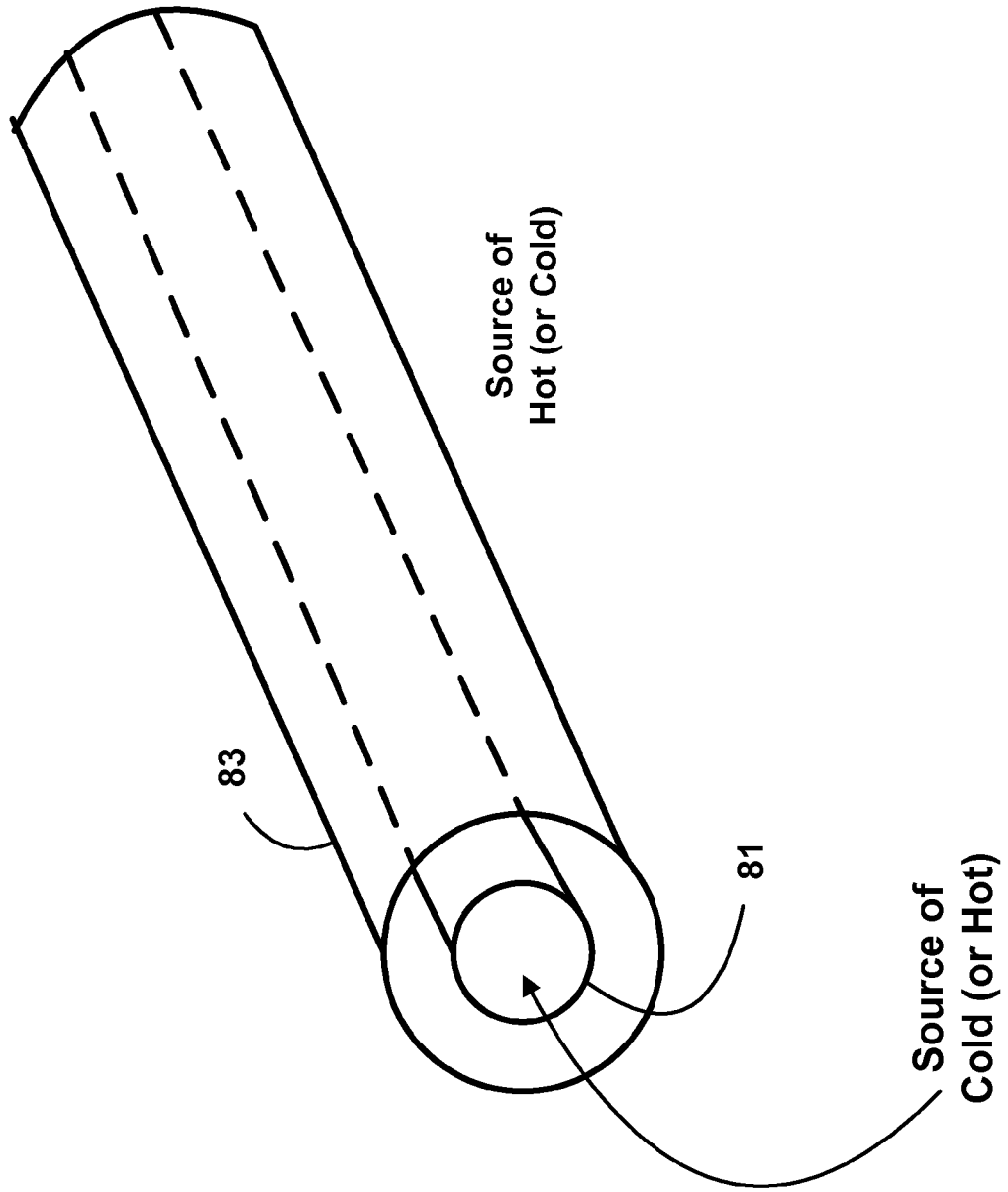
FIG. 10 is a schematic diagram of a tube-in-tune design for the heat engine(s) of the present invention.

As shown in FIG. 10, the heat engines described herein can be arranged in a tube-in-tube type configuration. In this configuration, an inner tube 81 carries the source of hot (or cold). The exterior of the outer tube 83 is subjected to the source of cold (or hot). The inner tube 81 and outer tube 83 are realized from thermally conductive material as described herein and thus function a heat exchangers. The hydrogen working fluid, metal hydride material and possibly phase change material of the engine are disposed in a closed space between the inner tube 81 and outer tube 83. The piezoelectric pressure transducer(s) of the engine can also be located within the closed space between the inner tube 81 and outer tube 83, or can possibly be located with a fluid path that is fluidly coupled to this closed space, for example, in a fluid supply line similar to that shown in FIGS. 9A and 9B.

There have been described and illustrated herein several embodiments of a system and methodology for generating electricity using piezoelectric material(s). While particular embodiments of the invention have been described, it is not intended that the invention be limited thereto, as it is intended that the invention be as broad in scope as the art will allow and that the specification be read likewise. Thus, while particular heat engine configurations have been disclosed, it will be appreciated that other heat engine configurations can be used as well. Also, while particular sources of hot and cold have been described, it is contemplated that the heat engine can be powered by other sources of hot and cold. For example, seawater and ambient air can be used as sources of cold and hot or vice versa, depending on the season. In addition, while particular types of electrostatic motors and electro-mechanical batteries have been disclosed, it will be understood that other types can be used. For example, it is contemplated that the permanent array of magnets of the electromechanical battery can be part of the stator and the windings that are electromagnetically coupled thereto can be part of the rotor. In another example, the stator assembly of the electrostatic motor can be disposed outside the rotor of the electrostatic motor. Also, while preferred electronic circuitry and components have been described, it will be recognized that other electronic circuitry and components can be similarly used. Moreover, while particular materials and designs have been disclosed in reference to the heat engine and piezoelectric transducer elements, it will be appreciated that other configurations could be used as well. It will therefore be appreciated by those skilled in the art that yet other modifications could be made to the provided invention without deviating from its spirit and scope as claimed.

What is claimed is:

1. A system for generating electrical signals comprising:
at least one heat engine having a subterranean geothermal energy source, the heat engine adapted to undergo a cycle of heating and cooling and to generate corresponding pressure variations within a chamber;
at least one piezoelectric transducer operably disposed within the chamber that deforms in response to the pressure variations within the chamber and generates an electrical output signal as a result of the deformation.

2. A system according to claim 1 further comprising:
a power converter operably coupled to the at least one piezoelectric transducer that transforms said electrical output signals to a desired electrical power supply signal.

3. A system according to claim 1, wherein:
the subterranean geothermal energy source is a subterranean geothermal source of cold used in conjunction with an ambient source of hot.

4. A system according to claim 1, wherein:
the subterranean geothermal energy source is a subterranean geothermal source of hot used in conjunction with an ambient source of cold.

5. A system according to claim 1, wherein:
hydrogen is disposed as a working fluid within the heat engine.

6. A system according to claim 5, wherein:
at least one metal hydride material is disposed within the heat engine, the metal hydride material for absorbing and desorbing hydrogen during the cycle of heating and cooling of the heat engine.

7. A system according to claim 6, wherein:
at least one phase change material is disposed within the heat engine.

8. A system according to claim 7, wherein:
the metal hydride material absorbs hydrogen at a first pressure and a first temperature, the first temperature corresponding to a temperature at which the phase change material releases heat.

9. A system according to claim 8, wherein:
the metal hydride material desorbs hydrogen at a second pressure and a second temperature, the second temperature corresponding to a temperature at which the phase change material absorbs heat.

10. A system according to claim 2, wherein:
the power converter comprises an electromechanical battery with a flywheel for storing rotational energy.

11. A system according to claim 10, wherein:
the power converter includes means for transforming rotational energy from the flywheel into the desired electrical power supply signal.

12. A system according to claim 10, wherein:
the electromechanical battery includes a rotor that is electromagnetically coupled to a stator, the rotor being operably coupled to the flywheel, and one of the rotor and stator comprises a permanent array of magnets.

13. A system according to claim 10, wherein:
the power converter includes an electrostatic motor operably coupled to the electromechanical battery for adding rotational energy to the flywheel.

14. A system according to claim 13, wherein:
the electrostatic motor includes a rotor and stator that are rotated relative to one another via repulsive coulomb forces, said rotor operably coupled to the flywheel of the electromechanical battery.

15. A system according to claim 13, wherein:
the power converter comprises interface circuitry operably coupled between the at least one piezoelectric transducer element and the electrostatic motor.

16. A system according to claim 15, wherein:
the interface circuitry comprises a Marx generator circuit.

17. A system according to claim 16, wherein:
the interface circuitry comprises an AC-DC rectifier and a filter capacitor that cooperate to generate a charging voltage signal for input to the Marx generator circuit.

* * * * *